Figure 1:
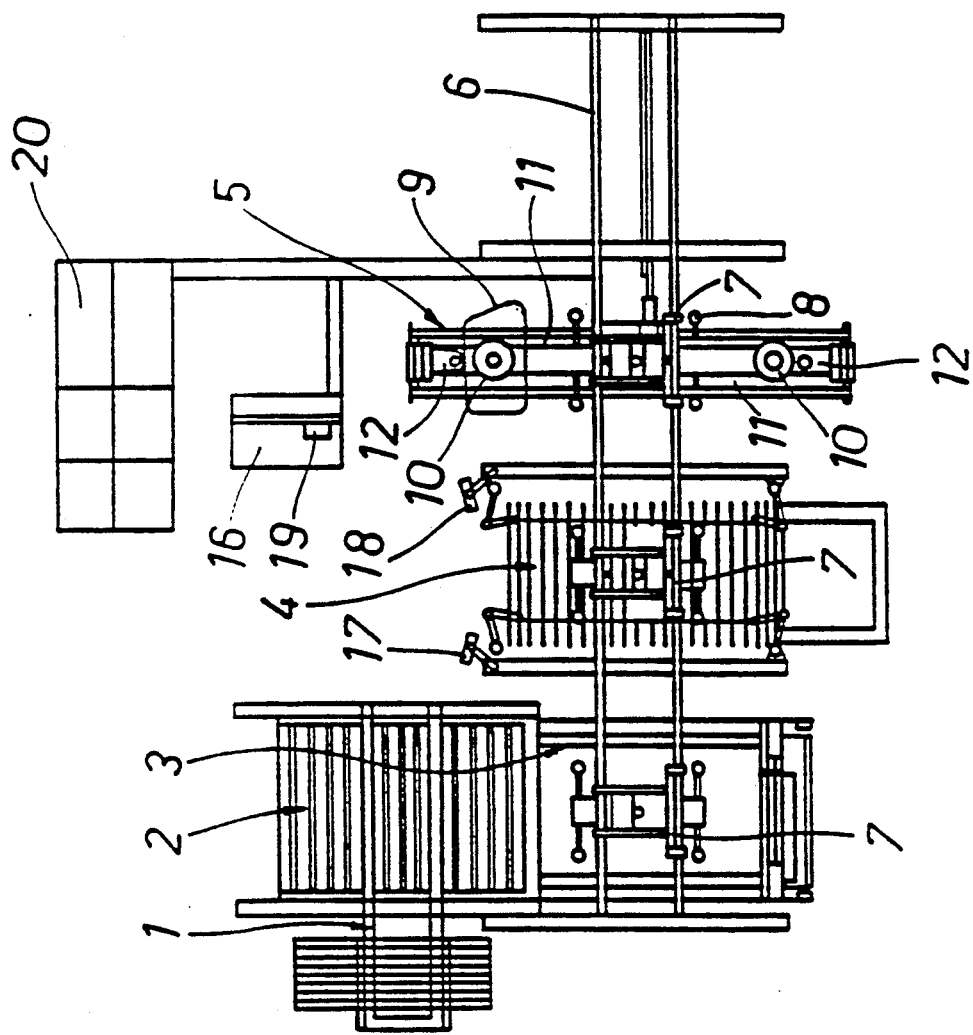

United States Patent [19]
Ikola et al.

[11] Patent Number: 5,325,635
[45] Date of Patent: Jul. 5, 1994

[54] CUTTING AND GRINDING APPARATUS FOR A GLASS SHEET EDGE

[75] Inventors: Kimmo J. Ikola, Kangasala; Kimmo E. Stenman, Tampere, both of Finland

[73] Assignee: Tamglass Engineering Oy, Finland

[21] Appl. No.: 50,314

[22] PCT Filed: Nov. 20, 1991

[86] PCT No.: PCT/FA91/00347
§ 371 Date: May 10, 1993
§ 102(e) Date: May 10, 1993

[87] PCT Pub. No.: WO92/09404
PCT Pub. Date: Jun. 11, 1992

[30] Foreign Application Priority Data

Nov. 22, 1990 [FI] Finland .................. 905760

[51] Int. Cl.$^5$ .................. R24B 9/10; C03B 33/02
[52] U.S. Cl. .................. 51/165.71; 51/283 E; 51/5 C; 51/106 R
[58] Field of Search .............. 51/283 E, 283 R, 284 E, 51/89, 95 R, 105 R, 105 EC, 105 LG, 106 R, 106 LG, 165.71, 165.8

[56] References Cited

U.S. PATENT DOCUMENTS

| | | | |
|---|---|---|---|
| 5,005,318 | 4/1991 | Shafir | 51/283 R |
| 5,040,342 | 8/1991 | McGuire | 51/283 E |
| 5,079,876 | 1/1992 | Zumstein | 51/105 EC |
| 5,185,965 | 2/1993 | Ozaki | 51/283 E |

FOREIGN PATENT DOCUMENTS

| | | | |
|---|---|---|---|
| 2476059 | 8/1981 | France | 51/283 R |
| 0014453 | 1/1984 | Japan | 51/283 E |
| 2185363 | 7/1990 | Japan | 51/283 E |

Primary Examiner—Robert A. Rose
Attorney, Agent, or Firm—Burns, Doane, Swecker & Mathis

[57] ABSTRACT

The invention relates to a cutting and grinding apparatus for a glass sheet edge, comprising a grinding machine (5) which includes two rotatable glass-supporting tables (10) and displacement guides (11) for shifting tables (10) aside from a conveyor track (6) included in a primary conveyor (6, 7, 8). Two grinding heads (12) are mounted on the outer ends of displacement guides (11) of said tables (10) and a displacement mechanism (15) for tables (10) is controlled to carry out the shifting movement of tables (10) between conveyor track (6) and grinding head (12). The same displacement mechanism (15) is also controlled to perform the advancing movement during a grinding operation for maintaining the edge of a glass sheet (9) in contact with a grindstone (13) during the rotation of a glass sheet having a shape other than circular.

5 Claims, 2 Drawing Sheets

CUTTING AND GRINDING APPARATUS FOR A GLASS SHEET EDGE

The present invention relates to a cutting and grinding apparatus for a glass sheet edge, comprising a cutting machine for cutting a contour, a crushing machine for removing an edge zone outside the cut contour, a grinding machine for grinding the edges of a glass sheet blank, and a conveyor for carrying a glass sheet blank to each of the above-mentioned machines for performing their respective cutting, edge-removing and grinding operations, said grinding machine comprising two rotatable glass-supporting tables and two grinding heads, positioned relative to the tables in a manner that the edges of glass sheets lying on the tables can each be brought into a contact with its respective grindstone.

This type of automatic cutting and grinding mechanisms are particularly useful in the production of automotive windshields, backlights and side windows. One example of this type of cutting and grinding apparatus is disclosed in the Applicant's laid-open European Patent application EP 0315202. The apparatus disclosed in the cited publication two grinding heads for a single rotatable glass-supporting table, said heads moving towards and away from each other as a glass sheet is rotating therebetween. This arrangement is well suitable for windshields and backlights, which are relatively symmetrical regarding the centre axis of glass. However, this arrangement is poorly suitable for grinding asymmetrical side glazings, since manoeuvring the movements of grinding heads will be difficult to control.

Since in the sequentially performed operations (cutting, edge-crushing, and grinding), the most tedious one is grinding, the production line requires two grinding heads for a grinding machine not to bring down the production capacity of the entire apparatus. In order to eliminate this problem, it is prior known to divide a production line to two parallel grinding machines.

In this prior known apparatus, glass sheets are carried from a primary production line onto grinding machine tables, which are rotated around a stationary axis while manoeuvring a grinding head for providing a grinding feed according to the shape of a glass sheet. From grinding machines said glass sheets are carried onto a parallel line for further treatment. Branching off a production line to run through two independent grinding machine is an expensive and bulky solution and involves a further drawback, namely that the flow of material does not remain linear and, thus, the position oriented for a glass sheet on a cutting table can be no longer utilized in a post-grinding further treatment. The expensive and complicated structure is primarily due to the fact that carrying a glass sheet through a grinding machine requires its own conveyor mechanism and operating a grinding head requires its own handling mechanism.

An object of the invention is to provide a cutting and grinding apparatus of the above-mentioned type capable of achieving a high capacity by using two grinding heads without the above drawbacks.

This object is achieved according to the invention in a manner that the apparatus is further provided with displacement guides for shifting the tables aside from the transfer line of said conveyor, as well as with a displacement mechanism for tables, which is on the one hand controlled to carry out a shifting movement between a transfer line and a grinding head and, on the other hand, an advancing movement during a grinding operation for maintaining the edge of a glass sheet in contact with a grindstone during the rotation of a glass sheet having a shape other than circular.

This apparatus according to the invention is capable of offering the following benefits:

high production capacity;

a simple design and little space needed, since the same displacement mechanism is operated to carry out both a shifting movement and a working advancement, whereby the position of a grinding head can be stationary, following a grinding operation, a glass sheet can be returned onto the primary conveyor line to the exact position it was shifted to a grinding operation from, the flow of material remaining linear. Thus, even in a post-grinding further treatment, the exact position of a glass sheet is known. This positional information can be utilized e.g. in a drilling unit for drilling holes in the edges of a glass sheet, a grinding head maintained at a stationary position is convenient in terms of service or maintenance, the direct use of an abrasive disc is readily achieved (no vibrations), the vertical adjustment of an abrasive disc is readily achieved (according to glass thickness), and the cooling and splash-proofing of an abrasive disc is also readily achieved.

Figure 2:
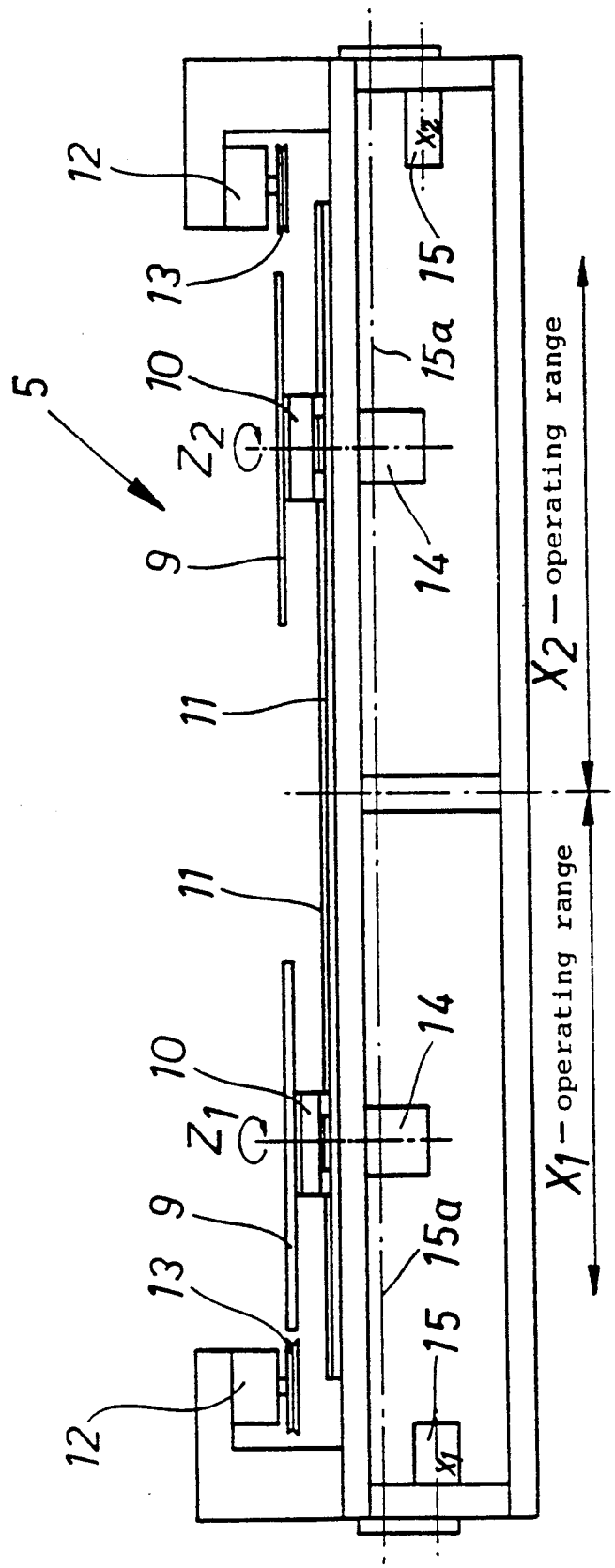

An example of one embodiment of the invention will now be described in more detail with reference made to the accompanying drawings, in which FIG. 1 shows a cutting and grinding apparatus of the invention in a plan view, and FIG. 2 shows a grinding machine included in the apparatus in a lateral view as seen from the direction of a primary conveyor line.

The apparatus includes an automatic loading unit 1 for placing glass sheet blanks onto a loading conveyor 2 which carries the glass sheet blanks to a cutting machine 3. In the cutting machine 3, a glass sheet blank is cut to form therein a contour or an outline, which corresponds to a desired shape or configuration, and an edge portion remaining outside said contour will be detached and removed in a subsequent edge-crushing machine 4. The design and operation of cutting machine 3 and edge-crushing machine 4 are described in detail in the above-cited Patent publication EP 0315202, included herein as reference. Next in the production line is a grinding machine 5, explained in detail hereinafter.

In view of carrying glass sheets from a machine to another, there is provided a conveyor assembly arranged above the machines and comprising guides or tracks 6 carrying three carriages 7, which are mechanically coupled at a distance from each other corresponding to the distance between the centres of machines 3 and 4. Carriages 7 are provided with movable suction pad elements 8 for picking up the glass. Tracks 6 extend linearly also beyond grinding machine 5, the flow of material remaining linear through all processing operations. This has been facilitated by means of a grinding machine design of the invention, which is described in the following.

The grinding machine 5 includes two rotatable tables 10 which support glass sheet blanks 9 set for grinding. Tables 10 are mounted on displacement guides 11, which extend below primary conveyor track 6 and are perpendicular to primary conveyor track 6. In the present case, displacement guides 11 extend symmetrically an equal distance on either side of primary conveyor track 6. Fixedly positioned grinding heads 12 are mounted on the outer ends of displacement guides 11, likewise symmetrically on either side of track 6. Each table 10 is movable along guides 11 from the mid-point of conveyor track 6 to a position adjacent to grinding head 12 and back again. As shown in FIG. 2, this shifting movement is achieved by means of a motor 15 which drives a shifting screw or chain 15A, indicated by a dash-and-dot line. The rotating motor for table 10 is indicated by reference numeral 14. The shifting motor 15 is controlled to first perform a shifting movement from conveyor 6 to grinding head 12. This is followed by controlling the same motor 15 to perform an advancing movement during a grinding operation in a manner that the edge of a glass sheet having a shape other than circular can be maintained in contact with a grindstone 13 while said table 10 is rotating glass sheet 9. This mutually dependent control of the advancing and rotating movement of table 10 can be achieved by using digital contour data file, whereby said cutting machine 3 is controlled to perform the cutting of a contour. The build-up and use of this digital 1 file are described in more detail in Patent publication EP 0315202, incorporated herein as reference.

While a glass sheet is being ground on one of the tables 10, the other table 10 shifts to a position below a carriage 7 mounted on conveyor 6 and suction pads 8 pick up the glass sheet. Carriages 7 perform a common displacement strike along tracks 6, whereby an edge-ground glass sheet blank carried by the first carriage 7 travels to a further treatment and a glass sheet blank carried by the second carriage 7 travels from edge-crushing machine 4 to grinding machine 5, wherein it is lowered onto grinding table 10 which carries it to a grinding operation. Immediately thereafter, the other grinding table 10 can shift an edge-ground glass sheet to a position below conveyor 6, 7, 8. As the flow of material remains linear and the edge-ground glass sheets are shifted to a further treatment from exactly the same position they were picked up for grinding, the exact position of glass sheets is also known in a post-grinding further treatment. Thus, e.g. on the table of a drilling unit, the holes can be drilled in the edges of a glass sheet without re-positioning. A precision-measured shifting movement is sufficient for positioning.

Reference numeral 16 indicates a control desk provided with a central computer to control the functions of various machine units 3, 4 and 5 by means of digital control files sep up therefor, as explained in more detail in Patent publication EP 0315202. Manual control units 17 and 18 can be used for operating cutting machine 3 and grinding machine 5 also as independent and separately controlled units. The control desk 16 is provided with a manual control panel 19 for manually controlling the disposition of the burners of edge-crushing unit 4 also during the normal operation of the apparatus. Reference numeral 20 indicates a power supply cabinet.

Naturally, the invention is not limited to the above-described embodiment but a plurality of changes and modifications can be made to structural details within the scope of the annexed claims.

We claim:

1. A cutting and grinding apparatus for a glass sheet edge, comprising a cutting machine (3) for cutting a contour, a crushing machine (4) for removing an edge zone outside the cut contour, a grinding machine (5) for grinding the edges of a glass sheet blank, and a conveyor (6, 7, 8) for carrying a glass sheet blank to each of the above-mentioned machines for performing their respective cutting, edge-removing and grinding operations, said grinding machine (5) comprising two rotatable glass-supporting tables (10) and two grinding heads (12), positioned relative to tables (10) in a manner that the edges of glass sheets (9) lying on the tables can each be brought into a contact with its own respective grindstone (13), characterized in that the apparatus further includes displacement guides (11) for shifting tables (10) aside from a transfer line (6) included in said conveyor (6, 7, 8), as well as a displacement mechanism (15) for tables (10), which is on the one hand controlled to carry out a shifting movement between transfer line (6) and grinding head (12) and, on the other hand, an advancing movement during a grinding operation for maintaining the edge of glass sheet (9) in contact with grindstone (13) during the rotation of a glass sheet having a shape other than circular.

2. An apparatus as set forth in claim 1, characterized in that said grinding heads (12) are stationary during a grinding operation.

3. An apparatus as set forth in claim 1 wherein said displacement guides are perpendicular to said linear transfer line and the centres of rotation of the grinding heads are located symmetrically on either side of said transfer line substantially on a line extending through the centres of rotation of the tables.

4. An apparatus as set forth in claim 1, wherein following a grinding operation said glass-supporting tables along with ground glasses lying thereon are carried onto said transfer line to the exact location where they received an unground glass blank.

5. An apparatus as set forth in claim 1, wherein said cutting machine (3) carries out the cutting of a contour according to a digital cutting file, characterized in that the advancing and rotating movement of table (10) during a grinding operation is controlled in a mutually dependent manner by means of the same digital contour file, whereby the cutting machine is controlled to carry out the cutting of a contour.

* * * * *